United States Patent [19]
Desnoyers et al.

[11] Patent Number: 6,098,104
[45] Date of Patent: *Aug. 1, 2000

[54] SOURCE AND DESTINATION INITIATED INTERRUPTS FOR MESSAGE ARRIVAL NOTIFICATION, AND RELATED DATA STRUCTURES

[75] Inventors: Christine M. Desnoyers, Pine Bush, N.Y.; Douglas James Joseph, New Fairfield, Conn.; Francis A. Kampf, Fairfax, Vt.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/824,697

[22] Filed: Apr. 8, 1997

[51] Int. Cl.$^7$ .................................................. G06F 13/00
[52] U.S. Cl. ............................................ 709/237; 710/268
[58] Field of Search ........................ 395/200.66, 200.75, 395/872, 735, 869; 709/236, 245, 237; 710/52, 49, 262, 268

[56] References Cited

U.S. PATENT DOCUMENTS

| | | | |
|---|---|---|---|
| 4,593,280 | 6/1986 | Grow | 370/453 |
| 4,604,500 | 8/1986 | Brown et al. | 379/269 |
| 4,905,233 | 2/1990 | Cain et al. | 370/237 |
| 5,161,156 | 11/1992 | Baum et al. | 714/4 |
| 5,166,674 | 11/1992 | Baum et al. | 340/825.07 |
| 5,201,044 | 4/1993 | Frey, Jr. et al. | 714/20 |
| 5,235,595 | 8/1993 | O'Dowd | 370/392 |
| 5,253,342 | 10/1993 | Blount et al. | 709/232 |
| 5,357,612 | 10/1994 | Alaiwan | 709/216 |
| 5,402,526 | 3/1995 | Bauman et al. | 706/49 |
| 5,491,799 | 2/1996 | Kreuzenstein et al. | 709/213 |
| 5,530,874 | 6/1996 | Emery et al. | 710/262 |
| 5,617,537 | 4/1997 | Yamada et al. | 709/214 |
| 5,790,804 | 8/1998 | Osborne | 709/245 |

FOREIGN PATENT DOCUMENTS

| | | |
|---|---|---|
| 0 664 487 A2 | 3/1995 | European Pat. Off. . |
| 4-107663 | 4/1992 | Japan . |
| 5-048672 | 2/1993 | Japan . |
| 5-073507 | 3/1993 | Japan . |
| 8-006783 | 1/1996 | Japan . |
| WO 96/13925 | 5/1996 | WIPO . |

OTHER PUBLICATIONS

Microsoft Press Computer Dictionary, 2nd Edition; Joanne Woodcock, Senior Contributor; pp. 194, 195, 1994.

"Polling Watchdog: Combining Polling and Interrupts for Efficient Message Handling", Maquelin et al., Proceedings of the 23rd Annual Symposium on Computer Architecture, Philadelphia, May 22–24, 1996.

"The Real–Time Operating System of Mars", Damm et al., Operating Systems Review (SIGOPS), vol. 23, No. 3, Jul. 1, 1989.

*Primary Examiner*—Kenneth R. Coulter
*Attorney, Agent, or Firm*—Heslin & Rothenberg, P.C.; Floyd A. Gonzalez, Esq.

[57] ABSTRACT

A method, system, and associated program code and data structures are provided for a message processing system in which messages are passed from source nodes to destination nodes. Notification of the arrival of the messages at the destination nodes can be effected by programmable source initiated interrupts or destination initiated interrupts. The source initiated interrupts are implemented as set fields embedded in the message packets sent from a source node to a destination node and trigger the requisite interrupt at the destination node upon message arrival. The destination initiated interrupts are implemented as pre-set fields in anticipatory buffers which are allocated at the destination node for incoming messages from the source node. Standard incoming message queue polling, as well as interrupt enabling and disabling functions are also provided, which together allow the system to selectively invoke interrupt or alternative strategies to notify destination nodes of arriving messages.

11 Claims, 5 Drawing Sheets

US 6,098,104

SOURCE AND DESTINATION INITIATED INTERRUPTS FOR MESSAGE ARRIVAL NOTIFICATION, AND RELATED DATA STRUCTURES

BACKGROUND OF THE INVENTION

Message processing systems, for example, the multiprocessor data processing system 10 depicted in FIG. 1, require reliable message communication paths between respective ones of the processors $12_1 \ldots 12_N$. The exemplary system 10 of FIG. 1 employs an exemplary communication medium or switch network 20 commonly coupled to the processors 12. The processors may require respective communication adapters $14_1 \ldots 14_N$ to control communications between each processor 12 and the medium 20 via respective connections $16_1 \ldots 16_N$. Communication between, for example, software application(s) executing on the processors 12 of system 10 can thus be provided via medium 20.

Because respective processors may be supporting different, asynchronous application software partitions, asynchronous messaging becomes a useful form of communication between the processors. At a destination processor (e.g., processor $12_N$), incoming asynchronous messages are conventionally buffered in a message receive queue. The application software executing on processor $12_N$ is therefore often required to poll or monitor the queue to determine if any messages have arrived. However, obtaining the status of these received messages can cause additional overhead due to unnecessary polling when waiting for a particular message, or any message, to arrive. For some applications, this additional overhead may not significantly impact system performance, and can therefore be tolerated. However, for other applications, this additional overhead may severely impact performance and polling or monitoring the message receive queue becomes an unacceptable approach.

In addition to the above-noted concerns regarding the polling or monitoring of message queues by a destination processor, there may be circumstances in which a source processor (e.g., processor $12_1$) would prefer to expressly notify the message destination processor upon the arrival of a message having a certain type or priority.

What is required, therefore, is a flexible method and system, including the implementing hardware, software and data structures, which will provide the respective processors in the system and/or the application software running thereon additional options to effect notification of a destination upon the arrival of a message. This method and system should not impose any particular notification strategy, but rather should provide additional, programmable arrival notification options so that the most suitable option can be chosen in view of the requirements of a particular application.

SUMMARY OF THE INVENTION

A flexible message arrival notification technique is provided by the present invention, which relates to a method, system, article of manufacture containing program code, and data structures for notifying a destination node of the arrival of individual messages thereat. Source and destination initiated interrupts are provided by the present invention on a programmable, per-message basis.

For example, consider first and second arbitrarily ordered messages, to which the two types of interrupt initiation of the instant invention will be applied, respectively. For the first message, the invention includes setting a source initiated interrupt (SII) field in the first message at a source node from which the first message is sent, and generating an interrupt at the destination node in response to the set SII field upon arrival of the first message at the destination node.

For the second message, the invention includes pre-setting a destination initiated interrupt (DII) field at the destination node, and generating an interrupt at the destination node in response to the pre-set DII field upon arrival of the second message at the destination node.

Because the source and destination nodes may be operating asynchronously, it is entirely possible that for any given message, e.g., the first or second message, both nodes may (redundantly) set the interrupt field(s), thereby triggering the interrupt.

For other messages, the invention may also include polling a message receive queue at the destination node to determine whether any other messages have arrived at the destination node. Upon a determination from the polling that at least one message has arrived, the message is processed at the destination node. The interrupt generating can be enabled or disabled using a programmable interrupt enabling mask.

Setting the SII field may be included in the actual sending of the message from the source node to the destination node. The sending may include creating a formatted send message descriptor (SMD) at the source node, the SMD containing send control information for the message, including the SII field. Pre-setting the DII field at the destination node may be included in the allocation of a buffer at the destination node into which the message is to arrive. Allocating the buffer may include creating a formatted receive message descriptor (RMD) at the destination node, the RMD containing receive control information for the message, including the DII field.

The messages, the send message descriptor and the receive message descriptor may each include a formatted header data structure, including the SII field and the DII field, or a single, common field for both, to support the programmable source and destination initiated interrupts of the present invention.

The formatted message descriptors, message packets, and commands within the source and destination nodes also comprise data structure portions of the instant invention, and facilitate the implementation of source and destination initiated interrupts on a per message, system-wide basis.

The present invention therefore provides additional, programmable options to effect the notification of, for example, hardware, or software applications at a destination node upon the arrival of a message. The source and destination initiated interrupts of the present invention can be selectively invoked on a per message basis (along with other standard approaches such as polling) to meet the performance requirements of a particular application.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

Figure 1:
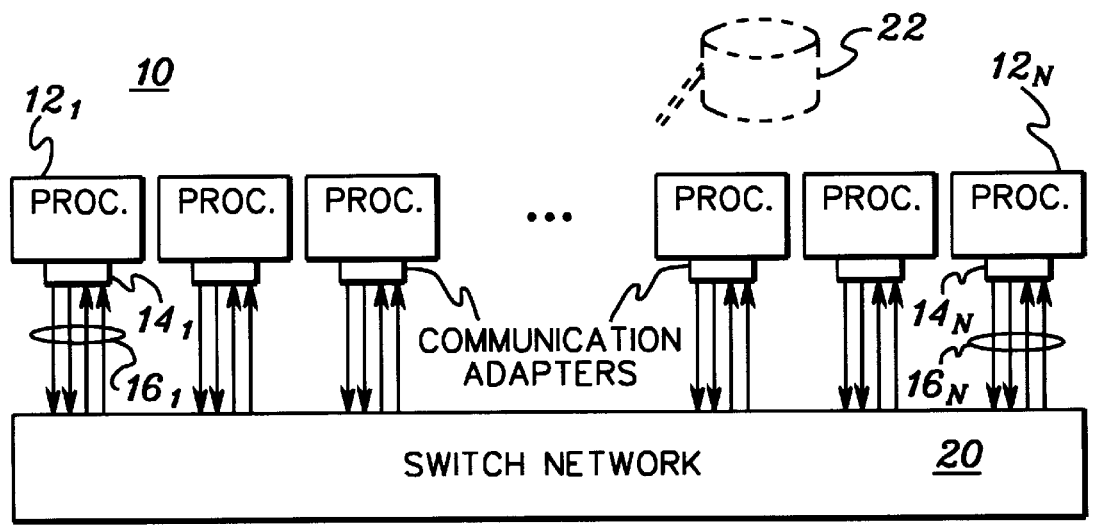
FIG. 1 depicts an exemplary message processing system having a plurality of processors coupled by a communication medium.

As discussed above, FIG. 1 depicts an exemplary message processing system in the form of a mutiprocessor data processing system 10 having a plurality of processors $12_1 \ldots 12_N$. Each processor may have a respective communication adapter 14 for operating its respective connection 16 to a commonly connected medium or switch network 20. A storage medium 22 may also be provided in the system to hold and/or support application software and all relevant data structures, protocols, etc.

Figure 2:
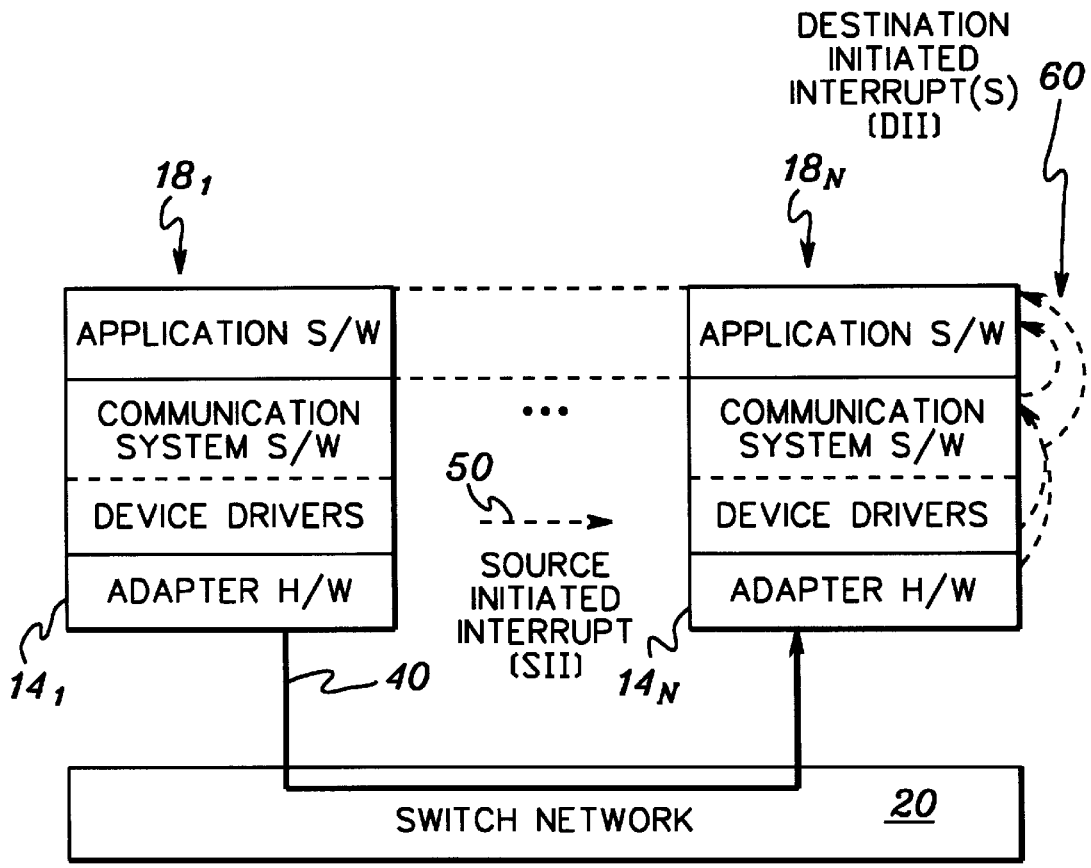
FIG. 2 is a hybrid hardware/software diagram depicting a message source and a message destination node, and source and destination initiated interrupts upon the arrival of a message in accordance with the present invention.

FIG. 2 is a hybrid hardware/software diagram of the system of FIG. 1 and depicts a message source node $18_1$ and a message destination node $18_N$. The term "node" is used broadly herein to connote any identifiable combination of hardware and/or software to or from which messages are passed. In FIG. 2, the application software partition of each respective node may or may not be related, i.e., may or may not be part of a common application. Higher level node hardware (e.g., 12 in FIG. 1) is also assumed present, at each node, but not shown. Lower level communication system software (CSS), device drivers, and adapter hardware 14 are also depicted at each node. It is assumed hereafter for illustrative simplicity that the application requires a message 40 to be sent from the source node $18_1$ to the destination node $18_N$ via the switch network 20. (However, all nodes in an actual system are expected to contain both the message sending and receiving capabilities discussed herein.)

In accordance with the instant invention, a source initiated interrupt (SII) 50 and destination initiated interrupt(s) (DII) 60 are provided such that upon the arrival of the message 40 at the destination node $18_N$, the destination node hardware, higher level application software, and/or communication system software (CSS) is instantly notified. Providing one or both of these types of interrupts allows immediate destination node notification when a message arrives. Both the source node and the destination node can determine when an interrupt is required and can initiate the requisite processing to effect the interrupt of the destination node upon arrival of the associated message.

As discussed in greater detail below, a source initiated interrupt is set at source node $18_1$ by setting a control field in the header data structure of the message 40. The message 40 itself therefore carries a set source initiated interrupt field such that upon arrival of the message at destination node $18_N$, the destination node hardware and/or software can be notified via an interrupt. In addition, the destination node itself can independently initiate a similar interrupt by presetting the same or similar field when a buffer is allocated at the destination node to receive an incoming message.

The destination node may retain its ability to poll an incoming message queue if it is preferred by the application(s) not to initiate interrupts. However, flexibility is provided to the application(s) regarding if and when to initiate interrupts for a particular message or a group of messages. The destination node may also contain a programmable interrupt mask for enabling or disabling entirely the processing of source or destination initiated interrupts, as well as for enabling or disabling other types of interrupts.

As discussed below, the system, software, commands, message packets and data structures of the instant invention all contain the requisite capabilities to support the programmable source and destination interrupts of the present invention on a per message, system-wide basis.

FIGS. 3–6, and the accompanying description below, disclose the hardware and software portions of an exemplary communication adapter 14 which facilitate the source and destination initiated interrupts of the present invention. This is an exemplary implementation only, and those skilled in the art will recognize that other hardware and software techniques are also available to implement the present invention.

Figure 3:
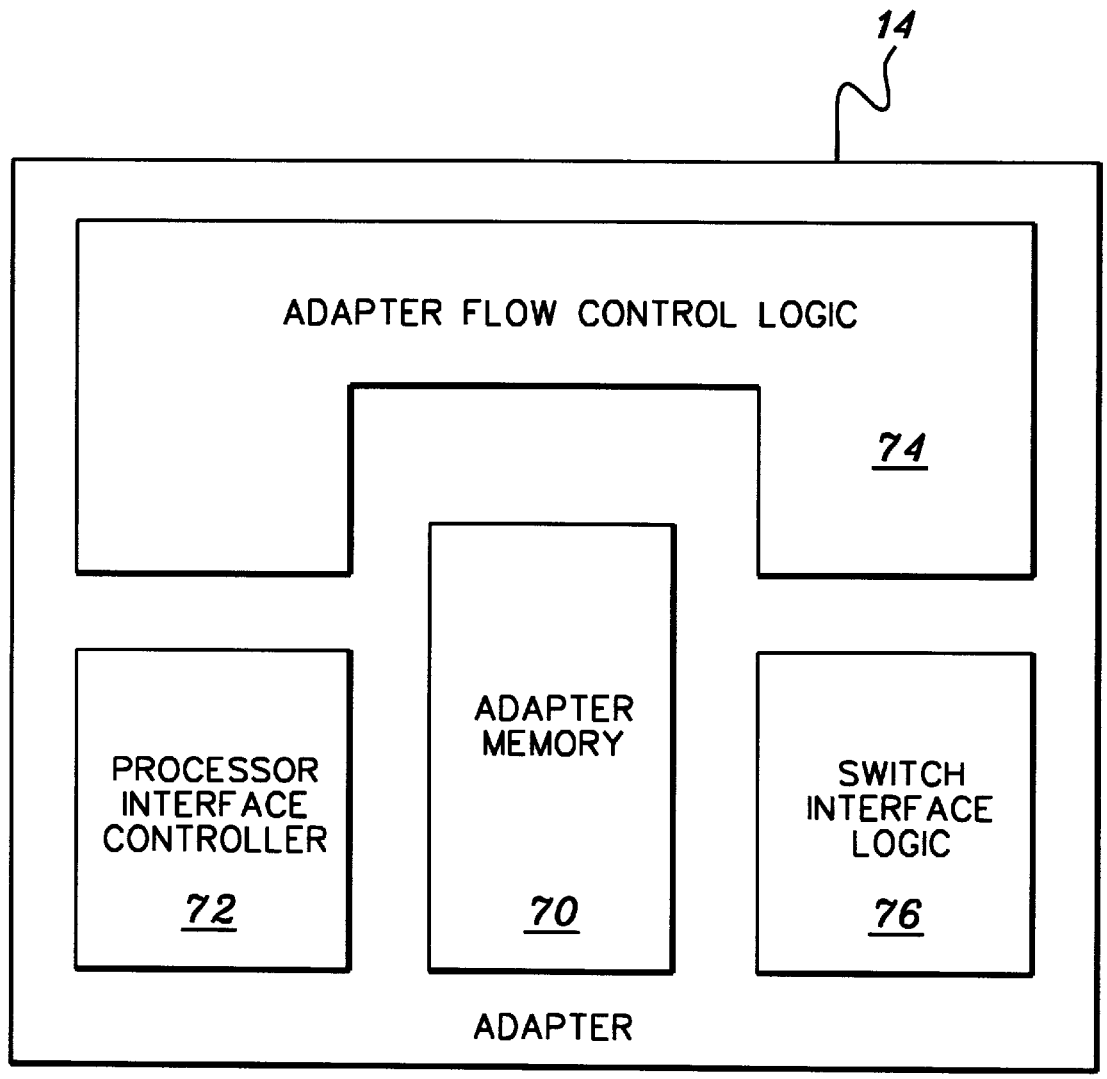
FIG. 3 depicts exemplary hardware subsystems of one of the communication adapters shown in FIG. 1 or FIG. 2.

With reference to FIG. 3, an exemplary communication adapter 14 of the source node $18_1$ and the destination node $18_N$ of FIG. 2 contains an adapter memory 70, a processor interface controller 72 for interfacing to the functional processors (e.g., processors 12 in FIG. 1), adapter flow control logic 74, and switch interface logic 76 for interfacing to the communication medium coupling the nodes (e.g., switch network 20 ). The adapter in general performs the functions required to split any given communication into packets if necessary, assemble the header information necessary to route each packet through the switch network, and to subsequently reassemble the packets at the destination node. In addition, the adapter may perform error detection, maintain tracking information to facilitate recovery from soft or hard errors during message transmission, as well as any other needed functions. The term "message" is used broadly herein to connote any type of communication between a source and destination node, and may comprise merely portions of data relating to a larger message, or may be dataless but comprise a header only which is of some utility to the system.

As discussed above with reference to FIG. 2, a layer of software referred to herein as the CSS lies between the application software and provides the requisite application software interface to the adapter hardware. The CSS may or may not include lower level device drivers necessary to operate the hardware subsystems in the adapter. It is preferably the CSS which is interrupted by either the source or destination initiated interrupts of the present invention upon message arrival, and the interrupt is handled in CSS supervisor processing space. However, as depicted in FIG. 2, the CSS may in turn interrupt the application software, or the application software may be interrupted directly upon the arrival of the message (assuming user-level interrupts are supported). Any relevant hardware interrupt lines, etc. may also be employed to effect the necessary interrupt.

In accordance with the invention, Send Message Descriptors are initialized and maintained on source node $18_1$ for outgoing messages. A Send Message Descriptor (SMD) is used to maintain the status of a message being transmitted. For each message sent, CSS assigns an SMD location in the adapter memory 70 at the source node. The SMD will be initialized by an adapter command, and will be updated as the message is sent to the destination node and acknowledged by the destination node. The SMD maintains the location of message data, the amount of message data, the destination of the message, and other vital information required for proper message transmission and recovery (if necessary). Similarly, at the destination node $18_N$, a Receive Message Descriptor (RMD) structure is used to maintain the status of a message being received. For each message to be received, CSS assigns an RMD location in the adapter memory 70 at the destination node. The RMD is initialized by an adapter command, and is updated as the message is received. (It should be noted that the message descriptors may or may not contain the actual message data sent or received. For larger messages, e.g., >1024 bytes, a separate buffer may be assigned, in which case the buffer address field is used in the descriptor to access the buffer. However, for shorter messages, the descriptor itself may function as the buffer itself, and may hold the actual message data.) The RMD maintains the location of the receive buffer, the size of the receive buffer, the expected source of the message and other vital information required for message reception and proper recovery.

Exemplary send and receive message descriptors are depicted below:

| 0 | 1 | 2 | 3 | 4 | 5 | 6 | 7 |
|---|---|---|---|---|---|---|---|
| CONTROL | | LENGTH | | TYPE | | DESTINATION | |
| SEQ# | STATE | reserved | | | | PA | CONTEXT |
| PRP_SDI | | PRP_RDI | | U_AQ_NEXT | | P_SQ_NEXT | |
| DESCRIPTOR_DATA(0) / BUFFER_ADDRESS | | | | | | | |
| DESCRIPTOR_DATA(1) | | | | | | | |
| DESCRIPTOR_DATA(2) | | | | | | | |
| - | | | | | | | |
| - | | | | | | | |
| - | | | | | | | |
| DESCRIPTOR_DATA(n-1) | | | | | | | |

Send Message Descriptor (SMD)

| 0 | 1 | 2 | 3 | 4 | 5 | 6 | 7 |
|---|---|---|---|---|---|---|---|
| CONTROL | | LENGTH | | reserved | | SRC_SEND_DESC | |
| SEQ# | STATE | SIZE | | reserved | | | |
| TYPE | | SOURCE | | PA | CONTEXT | Q_NEXT | |
| DESCRIPTOR_DATA(0) / BUFFER_ADDRESS | | | | | | | |
| DESCRIPTOR_DATA(1) | | | | | | | |
| DESCRIPTOR_DATA(2) | | | | | | | |
| - | | | | | | | |
| - | | | | | | | |
| - | | | | | | | |
| DESCRIPTOR_DATA(n-1) | | | | | | | |

Receive Message Descriptor (RMD)

In accordance with the present invention, the header portions of the message descriptor(s) contain a CONTROL area (shaded herein) in which the source initiated interrupt (SII) field and the destination initiated interrupt (DII) field (discussed above) are contained. The exemplary control area may contain 16 bits, two of which comprise the SII and DII field as set forth below:

CONTROL AREA:

| BIT # | DESCRIPTION |
|---|---|
| 0 | Kernel/-User Message |
| 1 | Descriptor Data/-DMA Data |
| 2 | Application/-Buffer Space |
| 3 | Source Initiated Interrupt (SII) |
| 4 | Destination Initiated Interrupt (DII) |
| 5 | Pull Reply |
| 6 | Pull Request |
| 7 | Recovery/-Rendezvous |
| 8 | Resend |
| 9 | Rendezvous Request |
| 10 | Undefined |

-continued

| BIT # | DESCRIPTION |
|---|---|
| 11 | Burst/-Non Burst |
| 12 | reserved (0 - identifier bit #0) |
| 13 | reserved (0 - identifier bit #1) |
| 14 | reserved (0 - identifier bit #2) |
| 15 | reserved (0 - identifier bit #3) |

Although in the instant exemplary embodiment, separate fields are allocated in the control areas for the SII and DII fields respectively, in an alternate embodiment these fields could be the same field, since in general the same type of interrupt is generated at the destination node upon arrival regardless of whether the source node or the destination node initiated the interrupt.

The control area discussed above in connection with the SMD and RMD is an area of memory which is supported and replicated throughout many data structures and commands in the adapters of the source node and the destination node, and facilitates the interrupts of the present invention on a per message, system-wide basis.

Figure 4:
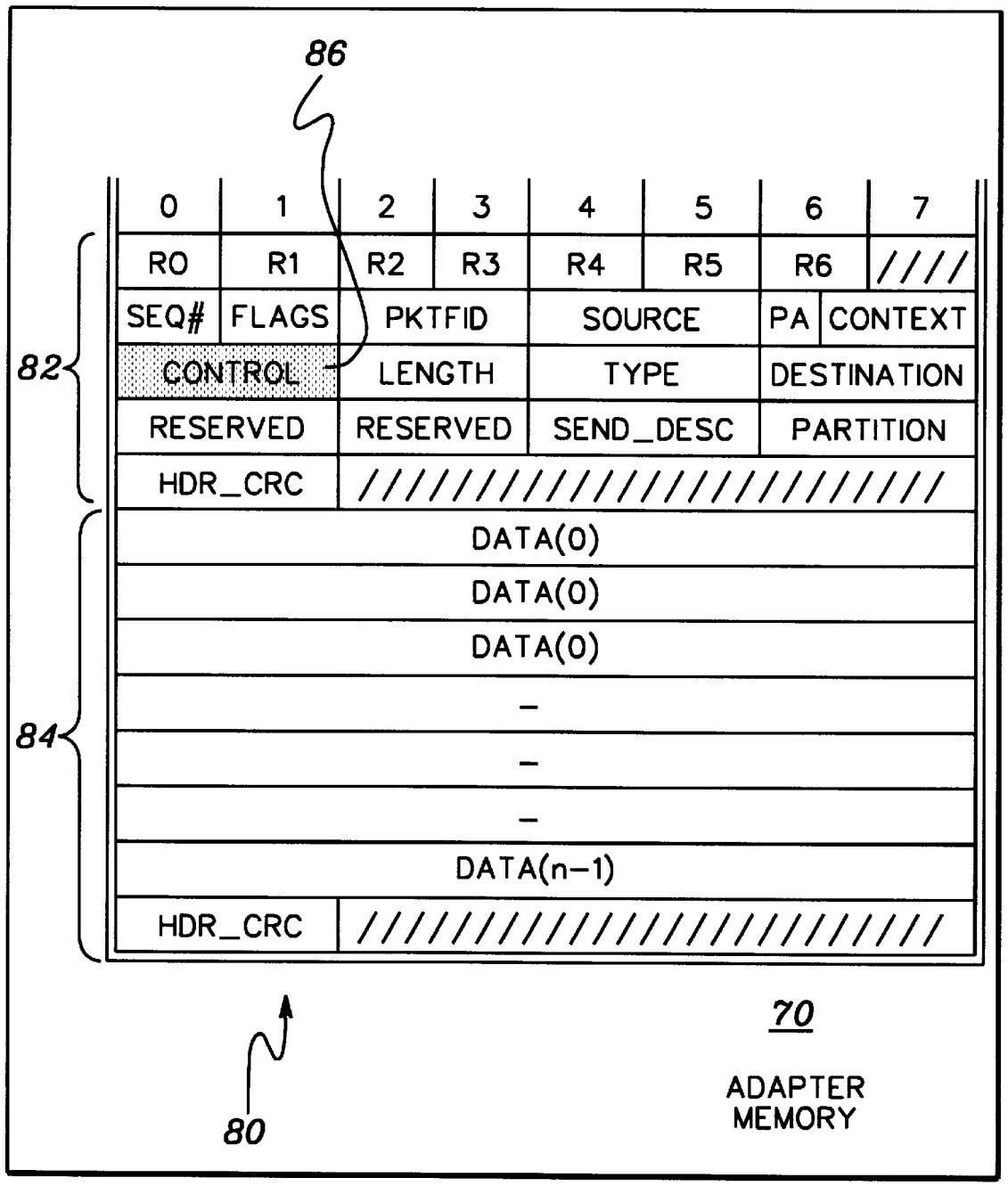
FIG. 4 depicts an exemplary message packet data structure having a header portion containing interrupt control fields, and a data portion, and resident in the memory of the exemplary communication adapter of FIG. 3.

For example, with reference to FIG. 4, an individual message packet 80 transmitted across medium 20 (and therefore necessarily maintained at each of the source and destination adapter memories 70 ) comprises a header portion 82 and a data portion 84. Contained within header portion 82 is CONTROL area 86 having the SII and DII fields allocated therein. Prior to receipt of the message at the destination node, only the SII field would be conceivably set. The DII may or may not be pre-set in a receiving buffer at the destination node also. Message packet 80 of FIG. 4 is reproduced below, as are other message packet structures which also adhere to the general header format containing the SII and DII fields. For example, a Pull Request Message Packet emanates from a destination node, and in response a Pull Reply Message Packet is sent from a source node containing the data. The "pull" packets are used for recovering from earlier attempts at sending standard message packets.

| 0 | 1 | 2 | 3 | 4 | 5 | 6 | 7 |
|---|---|---|---|---|---|---|---|
| R0 | R1 | R2 | R3 | R4 | R5 | R6 | ///// |
| SEQ# | FLAGS | PKTFID | | SOURCE | | PA | CONTEXT |
| CONTROL | | LENGTH | | TYPE | | DESTINATION | |
| reserved | | reserved | | SEND_DESC | | PARTITION | |
| HDR_CRC | | ///////////////////////////////////// | | | | | |
| DATA(0) | | | | | | | |
| DATA(1) | | | | | | | |
| DATA(2) | | | | | | | |
| - | | | | | | | |
| - | | | | | | | |
| - | | | | | | | |
| DATA(n-1) | | | | | | | |
| DATA_CRC | | ///////////////////////////////////// | | | | | |

Message Packet

-continued

| 0 | 1 | 2 | 3 | 4 | 5 | 6 | 7 |
|---|---|---|---|---|---|---|---|
| R0 | R1 | R2 | R3 | R4 | R5 | R6 | ///// |
| SEQ# | FLAGS | PKTFID | | SOURCE | | PA | CONTEXT |
| CONTROL | | LENGTH | | TYPE | | DESTINATION | |
| reserved | | reserved | | SEND_DESC | | PARTITION | |
| HDR_CRC | | ///////////////////////////////////// | | | | | |

Dataless Message Packet

| 0 | 1 | 2 | 3 | 4 | 5 | 6 | 7 |
|---|---|---|---|---|---|---|---|
| R0 | R1 | R2 | R3 | R4 | R5 | R6 | ///// |
| SEQ# | FLAGS | PKTFID | | SOURCE | | PA | CONTEXT |
| CONTROL | | reserved | | TYPE | | DESTINATION | |
| PRP_SDI | | PRP_RDI | | SEND_DESC | | PARTITION | |
| HDR_CRC | | ///////////////////////////////////// | | | | | |

Pull Request Message Packet

| 0 | 1 | 2 | 3 | 4 | 5 | 6 | 7 |
|---|---|---|---|---|---|---|---|
| R0 | R1 | R2 | R3 | R4 | R5 | R6 | ///// |
| SEQ# | FLAGS | PKTFID | | SOURCE | | PA | CONTEXT |
| CONTROL | | LENGTH | | TYPE | | DESTINATION | |
| reserved | | PRP_RDI | | SEND_DESC | | PARTITION | |
| HDR_CRC | | ///////////////////////////////////// | | | | | |
| DATA(0) | | | | | | | |
| DATA(1) | | | | | | | |
| DATA(2) | | | | | | | |
| - | | | | | | | |
| - | | | | | | | |
| - | | | | | | | |
| DATA(n-1) | | | | | | | |
| DATA_CRC | | ///////////////////////////////////// | | | | | |

Pull Reply Message Packet

Similarly, source and destination node adapter commands also support the control area containing the SII and DII fields. Exemplary formats of such commands are set forth below:

| 0 | 1 | 2 | 3 | 4 | 5 | 6 | 7 |
|---|---|---|---|---|---|---|---|
| CONTROL | | LENGTH | | TYPE | | DESTINATION | |
| reserved | | | | SEND_DESC | | PA | CONTEXT |
| DESCRIPTOR_DATA(0) / BUFFER_ADDRESS | | | | | | | |
| DESCRIPTOR_DATA(1) | | | | | | | |
| DESCRIPTOR_DATA(2) | | | | | | | |
| DESCRIPTOR_DATA(3) | | | | | | | |
| DESCRIPTOR_DATA(4) | | | | | | | |
| DESCRIPTOR_DATA(5) | | | | | | | |

Message Send Command

| 0 | 1 | 2 | 3 | 4 | 5 | 6 | 7 |
|---|---|---|---|---|---|---|---|
| CONTROL | | reserved | | SEND_DESC | | reserved | |

Message Resend Command

| 0 | 1 | 2 | 3 | 4 | 5 | 6 | 7 |
|---|---|---|---|---|---|---|---|
| CONTROL | | reserved | | TYPE | | DESTINATION | |
| PRP_SDI | | PRP_RDI | | SEND_DESC | | PA | CONTEXT |

Pull Request Message Send Command

| 0 | 1 | 2 | 3 | 4 | 5 | 6 | 7 |
|---|---|---|---|---|---|---|---|
| CONTROL | | LENGTH | | TYPE | | DESTINATION | |
| reserved | | | | SEND_DESC | | PA | CONTEXT |
| DESCRIPTOR_DATA(0) / BUFFER_ADDRESS | | | | | | | |
| DESCRIPTOR_DATA(1) | | | | | | | |
| DESCRIPTOR_DATA(2) | | | | | | | |
| DESCRIPTOR_DATA(3) | | | | | | | |
| DESCRIPTOR_DATA(4) | | | | | | | |
| DESCRIPTOR_DATA(5) | | | | | | | |

Pull Reply Message Post Command

| 0 | 1 | 2 | 3 | 4 | 5 | 6 | 7 |
|---|---|---|---|---|---|---|---|
| CONTROL | | reserved | | TYPE | | DESTINATION | |
| PRP_SDI | | SIZE | | SEND_DESC | | XX | CONTEXT |
| BUFFER_ADDRESS | | | | | | | |

Post Message Receive Buffer (PMRB) Command

The Message Send Command provides a mechanism for sending messages to a destination node through the adapter and across the medium. The command contains all the parameters required for creating the Send Message Descriptor (SMD) discussed above. When the sending adapter receives a Message Send Command, the specified SMD is initialized in adapter memory, and its selected fields are left blank for completion by the actual sending logic. It is at this point in the source node processing where the source initiated interrupt (SII) field in the SMD may be set, indicating a desire to interrupt the destination node upon arrival of the associated message at the destination node.

The Post Message Receive Buffer (PMRB) command provides a mechanism at the destination node for posting or allocating buffers in the receiving adapter's memory into which messages arriving from the medium will be received. This command contains all the parameters required for creating the Receive Message Descriptor (RMD) discussed above. When a PMRB command is invoked, the specified RMD is initialized in adapter memory with selected fields left blank for follow-on processing. It is at this point in the destination node processing where the DII field may be pre-set. The PMRB command is anticipatory in nature, that is, it is invoked not in response to the actual presence of any message, but rather in anticipation of a message arriving at the destination node. It is independently and asynchronously issued by the destination node software and it therefore directly follows that the destination initiated interrupt can be asynchronously invoked at the destination node on a per message basis, depending upon particular application requirements.

A list of posted buffers can be maintained in a posted buffer index table at the destination node. A posted buffer index table provides a mechanism for storing and retrieving posted receive buffers in the event messages are received.

The instant invention can also be implemented together with a polling approach to provide a greater amount of flexibility to the application. If neither the SII nor the DII field is set, polling can still be employed at the destination node. Received messages are assigned to posted RMDs at the destination node which, along with a User Message Receive Queue (UMRQ) FIFO, can be polled be an application program to determine if any messages have been received. The earliest of the messages received, i.e., the message at the output of the FIFO, is then first processed at the destination node followed by the messages following it in the FIFO. An exemplary UMRQ is shown below which implements a linked list of descriptors in adapter memory. The descriptor index of the first descriptor and the last descriptor are contained in the UMRQ, as is a count of the number of entries in the UMRQ. (The linked list of descriptors is completed using the Q_NEXT field within each RMD, which contains the address of the next RMD in the linked list.)

User Message Receive Queue (UMRQ)

| BIT # | RESET | DESCRIPTION |
|---|---|---|
| 0–15 | 0 x 0000 | UMRQ Head Index |
| 16–31 | 0 x 0000 | UMRQ Tail Index |
| 32–47 |  | (unused) |
| 48–63 | 0 x 0000 | UMRQ Count |

Polling the UMRQ FIFO is accomplished using the Message Receive Queue Fetch command, the fields of which are depicted below:

| 0 | 1 | 2 | 3 | 4 | 5 | 6 | 7 |
|---|---|---|---|---|---|---|---|
| RECV_DSC | | ARF_COUNT | MRQ_COUNT | | rsvd | RESP# |
| CONTROL | | LENGTH | | reserved | | SRC_SEND_DESC |
| SEQ# | STATE | SIZE | | reserved | | | |
| TYPE | | SOURCE | | PA | CONTEXT | Q_NEXT | |
| DESCRIPTOR_DATA(0) / BUFFER_ADDRESS |||||||| 
| DESCRIPTOR_DATA(1) ||||||||
| DESCRIPTOR_DATA(2) ||||||||
| - ||||||||
| - ||||||||
| - ||||||||
| DESCRIPTOR_DATA(n-1) ||||||||

Message Receive Queue Fetch (MRQF) Command

Figure 5:
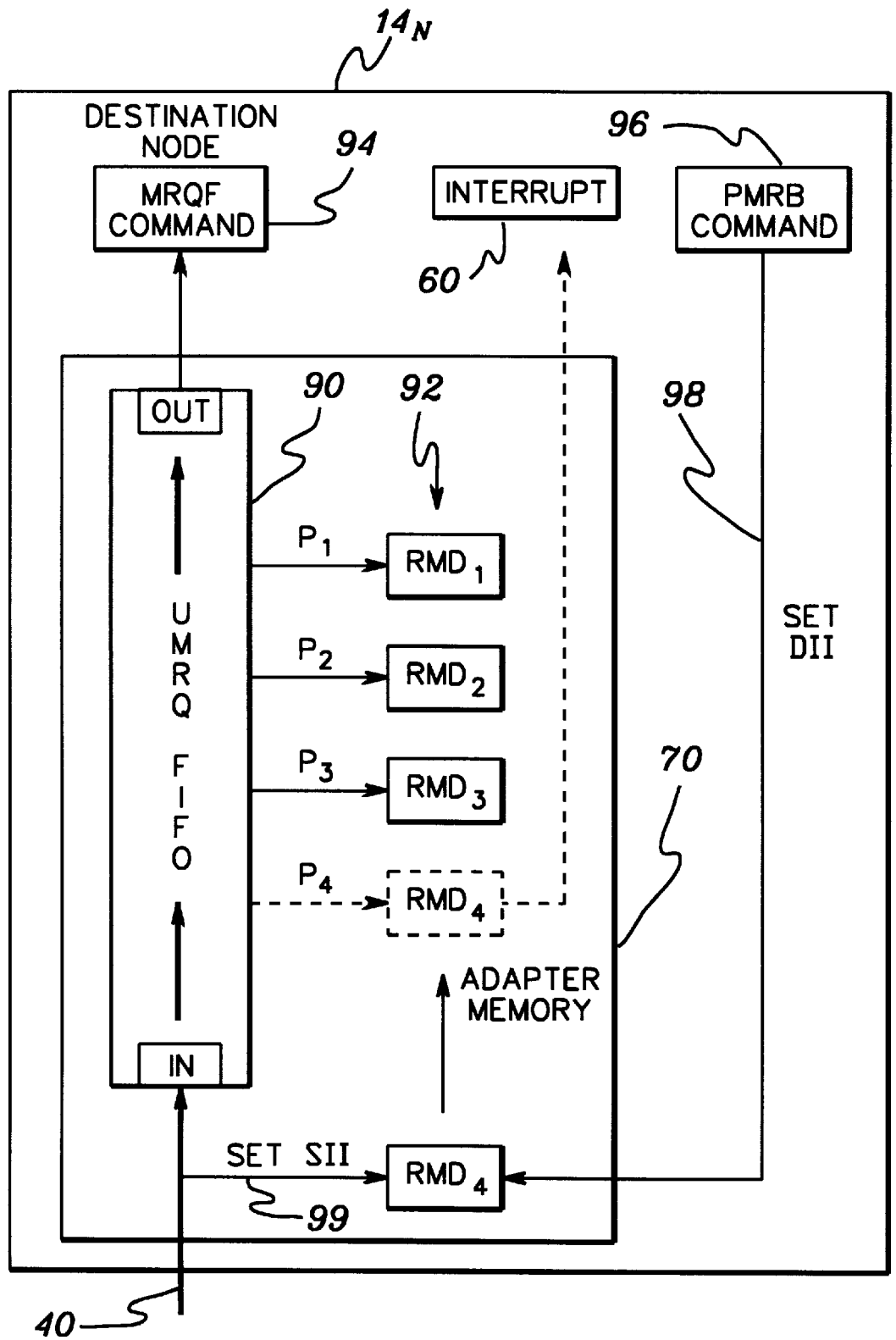
FIG. 5 is a command and data flow diagram for a message destination node illustrating the relationship between incoming messages, the message receive queue, the message processing commands, and the source and destination initiated interrupts in accordance with the present invention.

With reference to the destination node command and data flow diagram of FIG. 5, which depicts destination node $14_N$ including adapter memory 70, the UMRQ FIFO 90 can be visualized as implementing a list of pointers P1 . . . P$_4$ to a sequence of RMDs 92 (RMD$_1$ . . . RMD$_4$). The MRQF command 94 can be used to poll or monitor the output of UMRQ FIFO 90 for arriving messages. However, for interrupt operation, the PMRB command 96 can alternatively be used, as can the Message Send Command at the source node (via message 40), to set the SII and/or DII fields in the next RMD, RMD$_4$. The setting of the destination and/or source initiated interrupt is depicted as paths 98 and 99 in FIG. 5. Upon arrival of the message and its proper receipt into the UMRQ, the setting of either the SII or DII field will result in interrupt 60 within the destination node, notifying the node of the arrival of the incoming message. If, as in the example of FIG. 5, messages are located ahead of message 40 in the UMRQ FIFO, the application program can immediately commence repetitive MRQF commands to empty the queue. If, in another example, there are no messages ahead of the interrupting message in the UMRQ, the first MRQF command issued by the destination node software will retrieve the interrupting message.

The present invention therefore advantageously offers the flexibility of using standard polling approaches, and/or selective source or destination initiated interrupts, to notify applications upon message arrival. These capabilities can be provided to the system in the form of commands, descriptors, and message packets, all of which conform to the required format to support these capabilities on a system-wide basis. These capabilities can be selectively invoked on a per message basis to meet the performance requirements of a particular application.

Figure 6:
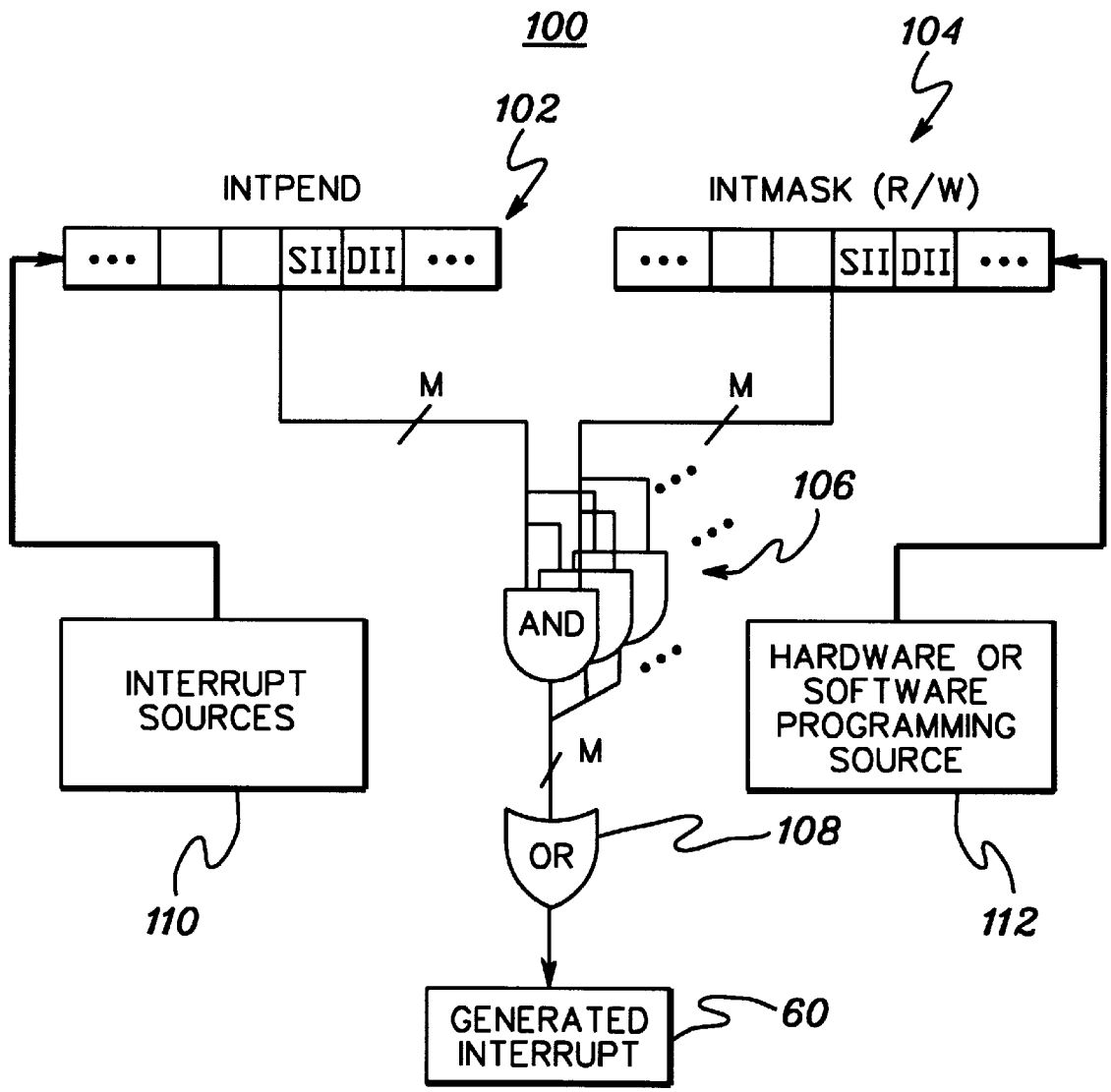
FIG. 6 depicts an exemplary circuit for enabling and disabling the source and destination initiated interrupts of the present invention using a programmable interrupt mask.

It may also be a requirement of a system to entirely disable certain types of interrupts. FIG. 6 depicts a circuit 100 for enabling and disabling interrupts and includes an interrupt pending register 102, which is filled by the interrupt sources 110 for M interrupts. A programmable enabling interrupt mask 104, accessible in a read/write fashion from hardware or software programming source 112, can be provided to entirely disable any one of a number (M) of interrupts in the system, including the above-described SII and DII type interrupts. In the exemplary circuit 100 of FIG. 6, the bits of the interrupt mask 104 are ANDed 106 with their corresponding bits in the interrupt pending register 102, and the result is then ORed 108 in its entirety to generate the interrupt 60. This is yet another level of interrupt programmability provided by the instant invention for entirely disabling the SII and DII type interrupt generation discussed above. (It is also possible for the register 102 to serve as a polled register, even if the interrupts are disabled by mask 104, in which case the higher level software can use polling techniques on register 102 similar to the polling techniques discussed above with reference to FIG. 5., to determine whether an interrupt event has occurred. This may be particularly useful for software applications wherein user-level interrupts are not supported.)

The present invention can be included in an article of manufacture (for example, one or more computer program products) having, for example, computer usable media such as the media 22 of FIG. 1 or the adapter memory 70 of FIGS. 3–5. The media has embodied therein, for example, computer readable program code means for providing and facilitating the mechanisms of the present invention. The article of manufacture can be included as part of a system or sold separately. Whether in the above-described article of manufacture, or within other memory components, the present invention also includes the formatted message, descriptor, command and other data structures discussed above which also facilitate the mechanisms of the present invention.

While the invention has been particularly shown and described with reference to preferred embodiment(s) thereof, it will be understood by those skilled in the art that various changes in form and details may be made therein without departing from the spirit and scope of the invention.

What is claimed is:

1. A memory for storing a header data structure, the leader data structure facilitating communication of message data from a source node to a destination node in a message processing system, the header data structure comprising:

an interrupt area reserved for said message data and allocated, on a per-message basis, for setting by the source node and the destination node and for triggering an interrupt at the destination node upon arrival of the message data at the destination node, wherein any interrupts triggered by the interrupt area set by the destination node are triggered independent of any control by the source node.

2. The memory of claim 1, wherein the interrupt area of the header data structure includes:

a source initiated interrupt field allocated for setting by the source node for triggering the interrupt at the destination node upon arrival of the message data at the destination node; and a destination initiated interrupt field allocated for setting by the destination node for triggering the interrupt at the destination node upon arrival of the message data at the destination node.

3. A system, comprising the memory of claim 1 in combination with the source node, the memory comprising:

a message packet structure including the header data structure.

4. The system of claim 3, wherein the interrupt area of the header data structure includes:

a source initiated interrupt field allocated for setting by the source node for triggering the interrupt at the destination node upon arrival of the message data at the destination node.

5. A system, comprising the memory of claim 1 in combination with the source node, the memory comprising:

a send message descriptor structure including the header data structure.

6. A system, comprising the memory of claim 1 in combination with the source node, the memory comprising:

a message send command structure including the header data structure.

7. A system, comprising the memory of claim 1 in combination with the destination node, the memory comprising:

a receive message buffer structure including the header data structure.

8. A system, comprising the memory of claim 1 in combination with the destination node, the memory comprising:

a message receive command structure including the header data structure.

9. The memory of claim 1, wherein the interrupt area comprises a common field allocated for setting by both the source node and the destination node.

10. A system, comprising a destination node, and a memory for storing a header data structure, the header data structure facilitating communication of message data from a source node to the destination node in a message processing system, the header data structure comprising:

an interrupt area allocated, on a per-message basis, for setting by the source node and the destination node and for triggering an interrupt at the destination node upon arrival of the message data at the destination node, wherein any interrupts triggered by the interrupt area set by the destination node are triggered independent of any control by the source node, the memory further comprising:

a receive message description structure reserved for, and to facilitate reception of, the message data and including the header data structure.

11. The system of claim 10, wherein the interrupt area of the header data structure includes:

a source initiated interrupt field allocated for setting by the source node for triggering the interrupt at the destination node upon arrival of the message data at the destination node; and a destination initiated interrupt field allocated for setting by the destination node for triggering the interrupt at the destination node upon arrival of the message data at the destination node.

* * * * *

UNITED STATES PATENT AND TRADEMARK OFFICE
CERTIFICATE OF CORRECTION

PATENT NO. : 6,098,104
DATED : August 1, 2000
INVENTOR(S) : Desnoyers et al.

It is certified that error appears in the above-identified patent and that said Letters Patent are hereby corrected as shown below:

Col. 1, line 5, insert the following before "BACKGROUND OF THE INVENTION":

--CROSS REFERENCE TO RELATED APPLICATIONS

This Application relates to the following commonly assigned, concurrently filed U.S. Patent Applications:

1. U.S. Patent Application No.: 08/835,434, filed April 8, 1997, U.S. Patent No. 6,098,105, issued August 1, 2000, Attorney Docket No. PO9-96-122, entitled "SOURCE AND DESTINATION INITIATED INTERRUPT METHOD FOR MESSAGE ARRIVAL NOTIFICATION"; and 2. U.S. Patent Application No.: 08/826,888, filed April 8, 1997, U.S. Patent No. 6,105,071, issued August 15, 2000, Attorney Docket No. PO9-97-031, entitled" SOURCE AND DESTINATION INITIATED INTERRUPT SYSTEM FOR MESSAGE ARRIVAL NOTIFICATION."

Each of these Applications is hereby incorporated by reference herein in its entirety.

TECHNICAL FIELD

This Application relates to message processing systems. More particularly, this Application relates to notifying a message destination upon the arrival of a message using programmable source and/or destination intiated interrupts.--

UNITED STATES PATENT AND TRADEMARK OFFICE
CERTIFICATE OF CORRECTION

PATENT NO. : 6,098,104
DATED : August 1, 2000
INVENTOR(S) : Desnoyers et al.

It is certified that error appears in the above-identified patent and that said Letters Patent are hereby corrected as shown below:

(Continued from Page 1 of 2)

IN THE CLAIMS:

Claim 1, Col. 10, line 61, delete "leader" and replace with --header--.

Claim 10, Col. 12, line 25, delete "description" and replace with --descriptor--.

Signed and Sealed this

Twenty-fourth Day of April, 2001

*Attest:*

NICHOLAS P. GODICI

*Attesting Officer*     *Acting Director of the United States Patent and Trademark Office*